(12) United States Patent
Tora et al.

(10) Patent No.: US 10,776,487 B2
(45) Date of Patent: Sep. 15, 2020

(54) SYSTEMS AND METHODS FOR DETECTING OBFUSCATED MALWARE IN OBFUSCATED JUST-IN-TIME (JIT) COMPILED CODE

(71) Applicant: Saudi Arabian Oil Company, Dhahran (SA)

(72) Inventors: Aminullah S. Tora, Dhahran (SA);
Faisal A. AlMansour, Dhahran (SA);
Faisal S. AlGhamdi, Dhahran (SA);
Rana Y. AlNujaidi, Doha (SA)

(73) Assignee: Saudi Arabian Oil Company, Dhahran (SA)

( * ) Notice: Subject to any disclaimer, the term of this patent is extended or adjusted under 35 U.S.C. 154(b) by 298 days.

(21) Appl. No.: 16/033,819

(22) Filed: Jul. 12, 2018

(65) Prior Publication Data
US 2020/0019704 A1    Jan. 16, 2020

(51) Int. Cl.
*G06F 21/00* (2013.01)
*G06F 21/56* (2013.01)
*G06F 16/903* (2019.01)
*G06F 8/36* (2018.01)
(Continued)

(52) U.S. Cl.
CPC .............. *G06F 21/566* (2013.01); *G06F 8/36* (2013.01); *G06F 9/4552* (2013.01); *G06F 9/45558* (2013.01); *G06F 16/903* (2019.01); *G06F 21/563* (2013.01); *G06F 21/567* (2013.01); *G06N 3/04* (2013.01); *G06F 2009/45575* (2013.01); *G06F 2009/45587* (2013.01)

(58) Field of Classification Search
None
See application file for complete search history.

(56) References Cited

U.S. PATENT DOCUMENTS

| 7,739,737 B2 | 6/2010 | Christodorescu et al. |
| 7,739,740 B1 | 6/2010 | Nachenberg et al. |
| 7,823,135 B2 | 10/2010 | Horning et al. |

(Continued)

FOREIGN PATENT DOCUMENTS

| CN | 105868630 A | 8/2016 |
| RU | 2622627 C2 | 6/2017 |

OTHER PUBLICATIONS

International Search Report and Written Opinion for International Application No. PCT/US2019/041689 report dated Oct. 9, 2019; pp. 1-13.

*Primary Examiner* — Shin-Hon (Eric) Chen
(74) *Attorney, Agent, or Firm* — Bracewell LLP; Constance G. Rhebergen; Brian H. Tompkins

(57) ABSTRACT

Systems and method for the detection of obfuscated malware in JIT code are provided. JIT code portions may be retrieved from a repository, and metadata associated with the JIT code may be determined. The JIT code and associated metadata may be hashed to determine a hash value that is compared to a cache of hash values corresponding to previously analyzed JIT code portions. If the JIT code portion has not been previously analyzed the JIT code portion may be parsed into a byte stream for execution in a JIT runtime environment in a virtual machines. The runtime data may be analyzed using signature matching, heuristic rule matching, n-gram analysis, and RNN analysis. If malware is detected, the JIT code portion, associated metadata, and analysis results may be provided for generation of an alert.

18 Claims, 8 Drawing Sheets

(51) Int. Cl.
*G06F 9/455* (2018.01)
*G06N 3/04* (2006.01)

(56) References Cited

U.S. PATENT DOCUMENTS

| | | | |
|---|---|---|---|
| 8,151,352 B1 | 4/2012 | Novitchi | |
| 8,176,559 B2 | 5/2012 | Mathur et al. | |
| 8,549,648 B2 | 10/2013 | Sallam | |
| 8,789,178 B2 | 7/2014 | Kejriwal et al. | |
| 8,850,585 B2 | 9/2014 | Bojaxhi et al. | |
| 8,949,660 B1 | 2/2015 | Pupius et al. | |
| 8,997,233 B2 | 3/2015 | Green et al. | |
| 9,038,184 B1 | 5/2015 | Mann | |
| 9,171,160 B2 | 10/2015 | Vincent et al. | |
| 9,213,836 B2 | 12/2015 | Cao et al. | |
| 9,294,486 B1 | 3/2016 | Chiang et al. | |
| 9,690,936 B1 | 6/2017 | Malik et al. | |
| 9,858,414 B2 | 1/2018 | Green et al. | |
| 10,581,879 B1 * | 3/2020 | Paithane | H04L 63/1416 |
| 2008/0016339 A1 | 1/2008 | Shukla | |
| 2009/0064118 A1 | 3/2009 | Raber | |
| 2009/0271867 A1 | 10/2009 | Zhang | |
| 2010/0024033 A1 | 1/2010 | Kang et al. | |
| 2011/0010697 A1 | 1/2011 | Golovkin | |
| 2011/0016522 A1 * | 1/2011 | Sheppard | G06F 21/563 726/22 |
| 2011/0030060 A1 | 2/2011 | Kejriwal | |
| 2011/0083183 A1 | 4/2011 | Freeman | |
| 2011/0197177 A1 | 8/2011 | Mony | |
| 2012/0159629 A1 | 6/2012 | Lee et al. | |
| 2012/0174225 A1 | 7/2012 | Shyamsunder et al. | |
| 2012/0174227 A1 * | 7/2012 | Mashevsky | G06F 21/562 726/24 |
| 2012/0221864 A1 | 8/2012 | Ciet et al. | |
| 2012/0290848 A1 | 11/2012 | Wang et al. | |
| 2013/0111547 A1 * | 5/2013 | Kraemer | G06F 21/56 726/1 |
| 2014/0130158 A1 | 5/2014 | Wang et al. | |
| 2015/0227742 A1 | 8/2015 | Pereira | |
| 2016/0212153 A1 * | 7/2016 | Livshits | G06F 21/563 |
| 2016/0381042 A1 | 12/2016 | Zhang | |
| 2017/0054554 A1 | 2/2017 | Park | |
| 2017/0076092 A1 | 3/2017 | Kashyap et al. | |
| 2018/0096149 A1 * | 4/2018 | Morkovsk | G06F 21/52 |
| 2018/0268141 A1 * | 9/2018 | Hagen | G06F 21/564 |

* cited by examiner

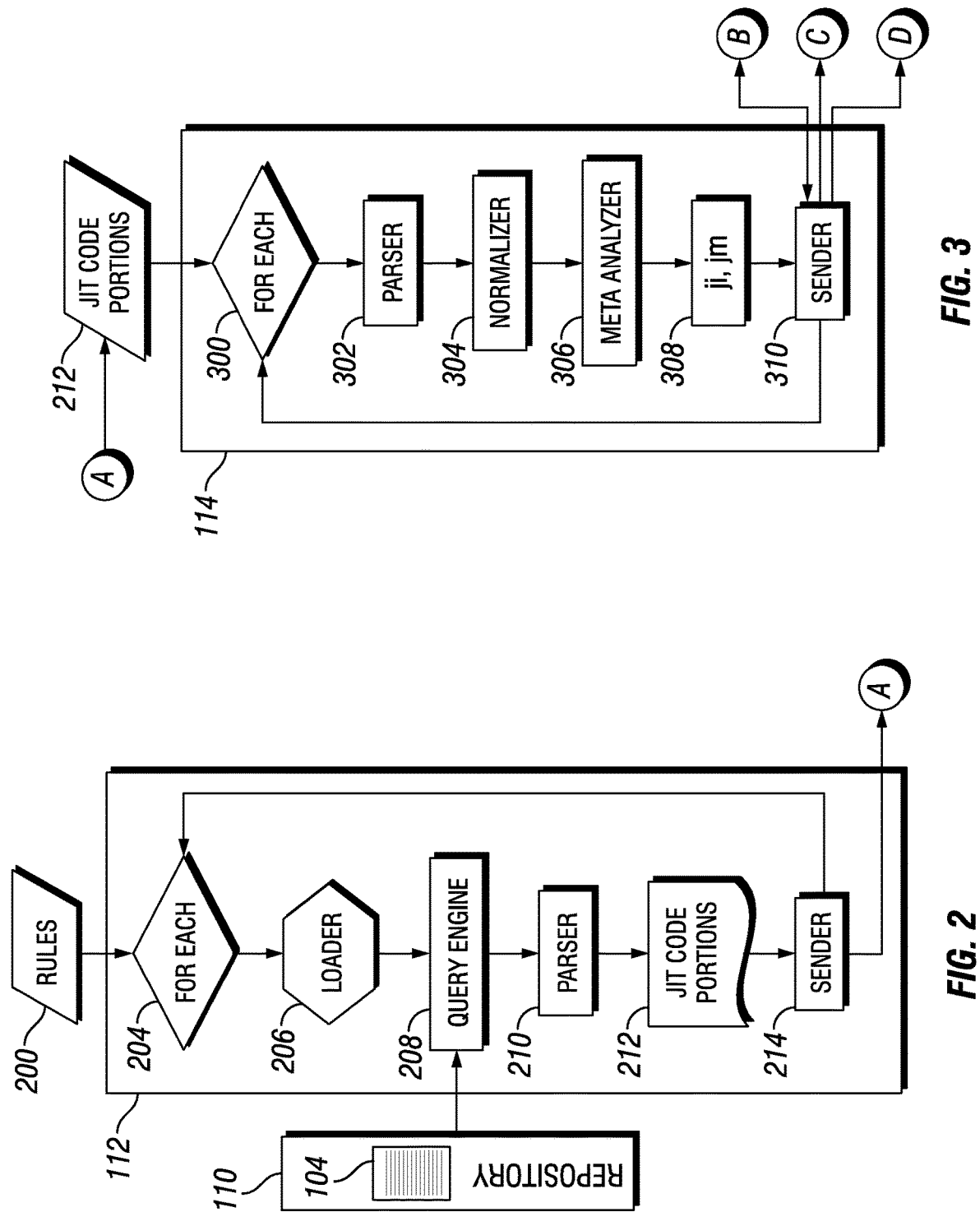

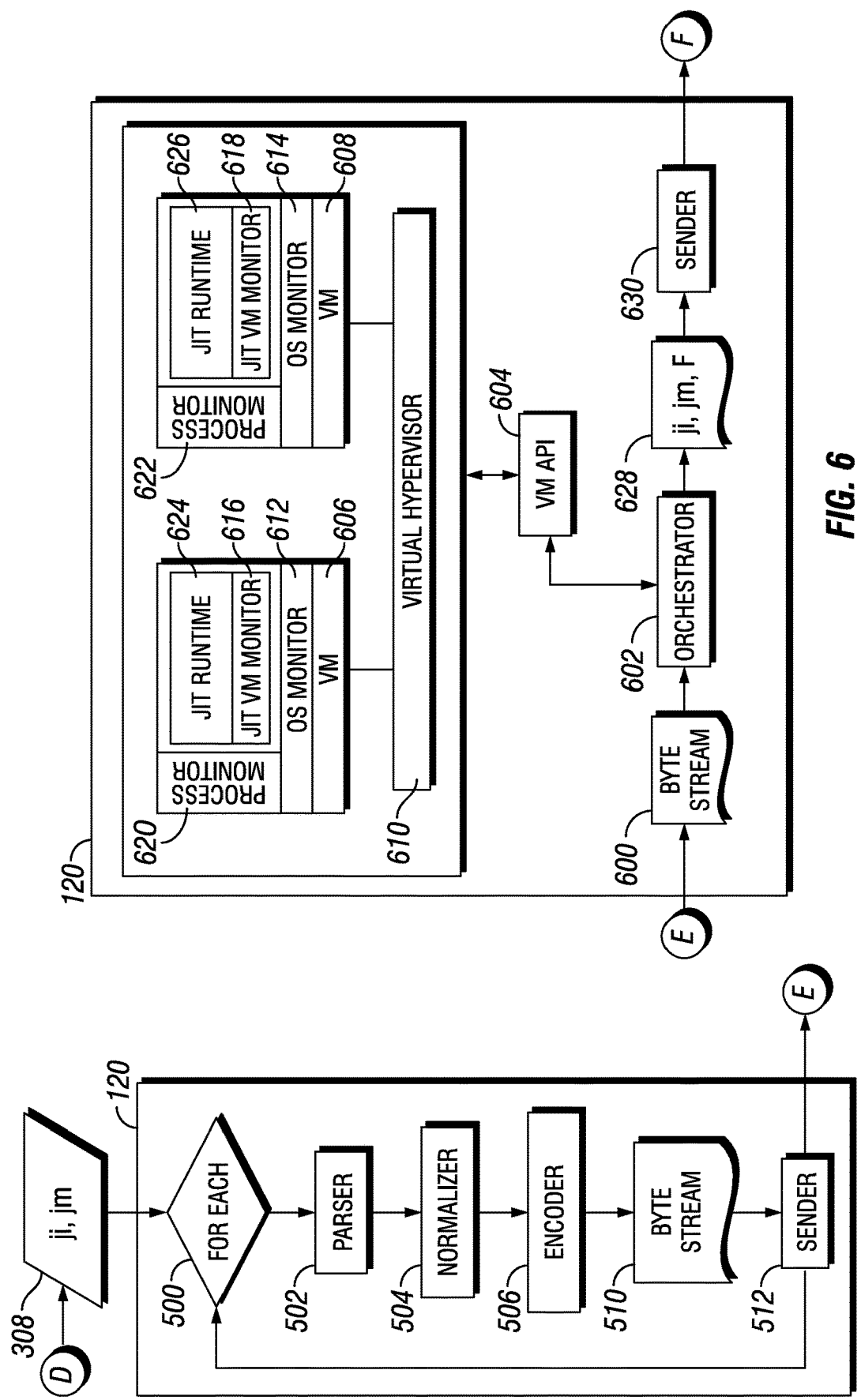

SYSTEMS AND METHODS FOR DETECTING OBFUSCATED MALWARE IN OBFUSCATED JUST-IN-TIME (JIT) COMPILED CODE

BACKGROUND

Field of the Disclosure

The present disclosure generally relates to the detection of malware. More specifically, embodiments of the disclosure relate to the detection of obfuscated malware in just-in-time (JIT) compiled software.

Description of the Related Art

Malicious software (referred to as "malware") may include a variety of different harmful, damaging, or intrusive software. Malware may include, for example, spyware, ransomware, adware, computer viruses, worms, Trojan horses, and other types of malicious software. Malware may use various vectors to infect a computer or propagate to other computers. The infection and propagation of malware in personal and commercial computers may result in significant economic damages and may be used to steal personal and confidential information or hold such information for ransom. In some instances, malware may also be used to damage or sabotage hardware.

SUMMARY

Existing malware detection systems are typically rule-based security systems. Such rule-based security systems are designed to match against known malicious patterns. However, malware authors routinely obfuscate their software to bypass security mechanisms by rendering rule-based systems obsolete. The majority of malware used in the initial phases of attacks use Just-in-Time (JIT) compiled languages. Such JIT compiled languages include Java, JavaScript, PowerShell, Python, Visual Basic Script, C #, VB.NET, and many other languages. When the malicious code is obfuscated, it becomes almost impossible for existing security systems to identify malicious code by static analysis and known malicious pattern matching as indicators. As used herein, the term "JIT code" refers to code written in a JIT compiled language and that is executed using JIT compilation. Such code may also be referred as "JIT-compiled code."

Consequently, obfuscation makes it extremely difficult for security systems or teams to identify malicious code. This difficulty is increased for security teams defending against a broad spectrum of malicious scripts or code written across numerous JIT compiled languages. Malware authors may also use multiple layered encoding and embedding to further increase the difficulty of detection. In order to perform specific pattern matching, security systems or teams need to first deobfuscate the code. Deobfuscation techniques may include monitoring for known obfuscation strings, statistical analysis, or entropy based analysis. However, implementation of these techniques is difficult, and, the techniques may be prone to false positives and false negatives.

As discussed herein, embodiments of the disclosure use dynamic execution of JIT compiled code in a monitored JIT environment to deobfuscate malware. Advantageously, the dynamic execution approach is more efficient and reliable than existing techniques. Embodiments of the disclosure include monitoring of runtime calls within the JIT runtime environment, resulting in improved malware detection via analysis of the runtime calls using the techniques described herein.

In one embodiment, a method for detecting obfuscated malware in just-in-time (JIT) code is provided. The method includes obtaining a portion of JIT code from a repository, associating the JIT code portion with metadata, and hashing the JIT code portion and metadata to generate a hash value. The method further includes comparing the hash value to a plurality of hash values stored in a cache, the plurality of hash values corresponding to a respective plurality of previously analyzed JIT code portions. The method further includes determining, based on the comparison of the hash value to the plurality of hash values, that JIT code portion is not one of the plurality of previously analyzed JIT code portions, encoding the JIT code portion into a byte stream, and instantiating a virtual machine that includes an executing environment for the JIT code portion. Additionally, the method includes executing the JIT code portion in the virtual machine, collecting runtime data during the executing, the runtime data including function calls, analyzing the runtime data for malware, and providing the JIT code portion and associated metadata for generation of a notification.

In some embodiments, obtaining the portion of JIT code from a repository includes selecting a rule from a rule base and querying the repository according to the selected rule. In some embodiments, analyzing the runtime data to detect malware includes comparing a signature of a known malicious indicator to the runtime data. In some embodiments, analyzing the runtime data to detect malware includes performing a heuristic matching of the JIT code based on a JIT code patterns or performing a heuristic matching of the runtime data based on runtime behavioral patterns. In some embodiments, analyzing the runtime data to detect malware includes performing an n-gram analysis of the runtime data based on a plurality of predetermined n-grams. In some embodiments, analyzing the runtime data to detect malware includes analyzing the runtime code using a recurrent neural network (RNN). In some embodiments, the metadata includes at least one of: a hostname, a host type, a host identifier, and a timestamp. In some embodiments, the method includes parsing the JIT code portion to determine the execution environment for execution of the compiled JIT code portion and selecting the execution environment before instantiating the virtual machine that includes an executing environment for the JIT code portion. In some embodiments, the hash value is a first hash value and the method includes hashing, after analyzing the runtime data to detect malware, the JIT code portion and the associated metadata to produce a second hash value and storing the second hash value in the cache of the plurality of previously analyzed hashed values.

In another embodiments, a system for detecting obfuscated malware in just-in-time (JIT) code is provided. The system includes a processor and a non-transitory computer readable memory having executable instructions stored thereon. The executable instructions include code that causes the processor to perform operations that include obtaining a portion of JIT code from a repository, associating the JIT code portion with metadata, and hashing the JIT code portion and metadata to generate a hash value. The operations also include comparing the hash value to a plurality of hash values stored in a cache, the plurality of hash values corresponding to a respective plurality of previously analyzed JIT code portions. The operations further include determining, based on the comparison of the hash value to the plurality of hash values, that JIT code portion is not one of the plurality of previously analyzed JIT code portions, encoding the JIT code portion into a byte stream, and instantiating a virtual machine that includes an executing environment for the JIT code portion. Additionally, the operations include executing the JIT code portion in the virtual machine, collecting runtime data during the executing, the runtime data including function calls, analyzing the runtime data for malware, and providing the JIT code portion and associated metadata for generation of a notification.

In some embodiments, analyzing the runtime data to detect malware includes comparing a signature of a known malicious indicator to the runtime data. In some embodiments, analyzing the runtime data to detect malware includes performing a heuristic matching of the JIT code based on a JIT code patterns or performing a heuristic matching of the runtime data based on runtime behavioral patterns. In some embodiments, analyzing the runtime data to detect malware includes performing an n-gram analysis of the runtime data based on a plurality of predetermined n-grams. In some embodiments, analyzing the runtime data to detect malware includes analyzing the runtime code using a recurrent neural network (RNN). In some embodiments, the metadata includes at least one of: a hostname, a host type, a host identifier, and a timestamp. In some embodiments, the system includes a network interface and the operations include sending, over the network interface, the alert to a security system.

In another embodiment, a non-transitory computer readable medium having executable instructions stored thereon for detecting obfuscated malware in just-in-time (JIT) code is provided. The executable instructions includes code that causes the processor to perform operations that include obtaining a portion of JIT code from a repository, associating the JIT code portion with metadata, and hashing the JIT code portion and metadata to generate a hash value. The operations also include comparing the hash value to a plurality of hash values stored in a cache, the plurality of hash values corresponding to a respective plurality of previously analyzed JIT code portions. The operations further include determining, based on the comparison of the hash value to the plurality of hash values, that JIT code portion is not one of the plurality of previously analyzed JIT code portions, encoding the JIT code portion into a byte stream, and instantiating a virtual machine that includes an executing environment for the JIT code portion. Additionally, the operations include executing the JIT code portion in the virtual machine, collecting runtime data during the executing, the runtime data including function calls, analyzing the runtime data for malware, and providing the JIT code portion and associated metadata for generation of a notification.

In some embodiments, analyzing the runtime data to detect malware includes comparing a signature of a known malicious indicator to the runtime data. In some embodiments, analyzing the runtime data to detect malware includes performing a heuristic matching of the JIT code based on a JIT code patterns or performing a heuristic matching of the runtime data based on runtime behavioral patterns. In some embodiments, analyzing the runtime data to detect malware includes performing an n-gram analysis of the runtime data based on a plurality of predetermined n-grams. In some embodiments, analyzing the runtime data to detect malware includes analyzing the runtime code using a recurrent neural network (RNN). In some embodiments, the metadata includes at least one of: a hostname, a host type, a host identifier, and a timestamp.

BRIEF DESCRIPTION OF THE DRAWINGS

FIG. 2 is a block diagram of the operation of a query module of the system of FIG. 1 in accordance with an embodiment of the disclosure;

FIG. 3 is a block diagram of the operation of a parser module of the system of FIG. 1 in accordance with an embodiment of the disclosure;

FIG. 5 is a block diagram of the operation of an encoder module of the system of FIG. 1 in accordance with an embodiment of the disclosure;

FIG. 6 is a block diagram of the operation of an monitored dynamic execution (MDE) module of FIG. 1 in accordance with an embodiment of the disclosure;

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include systems and method for the detection of obfuscated malware in JIT code. Embodiments include the retrieval of JIT code portions from a repository of JIT code obtained from servers, workstations, and other devices. A retrieved JIT code portion may be parsed and metadata associated with the JIT code portion may be determined. The JIT code portion and associated metadata may be hashed to determine a hash value that is compared to a cache of hash values corresponding to previously analyzed JIT code portions. If the JIT code portion has been previously analyzed as maliciousness, the JIT code portion, associated metadata and analysis results may be provided for generation of an alert.

If the JIT code portion has not been previously analyzed the JIT code portion may be parsed into a byte stream for execution in a JIT runtime environment in a virtual machines. The appropriate JIT runtime environment for the JIT code portion may be selected, and a virtual machine environment may be instantiated. The JIT code portion may be executed in the instantiated virtual machine, and runtime calls made by the JIT code portion are collected. The runtime data may include, for example, function calls, instructions, native system calls, library calls, and the like.

The runtime data may be analyzed using signature matching, heuristic rule matching, n-gram analysis, and RNN analysis. If malware is detected, the JIT code portion, associated metadata, and analysis results may be provided for generation of an alert, such as an alert that may be sent to a cybersecurity system. The JIT code portion and associated metadata may be hashed to generate a hash value, and the hash value and results analysis are stored in a cache of hash values of previously analyzed JIT code portions.

System for the Detection of Obfuscated Malware in JIT Code

Figure 1:
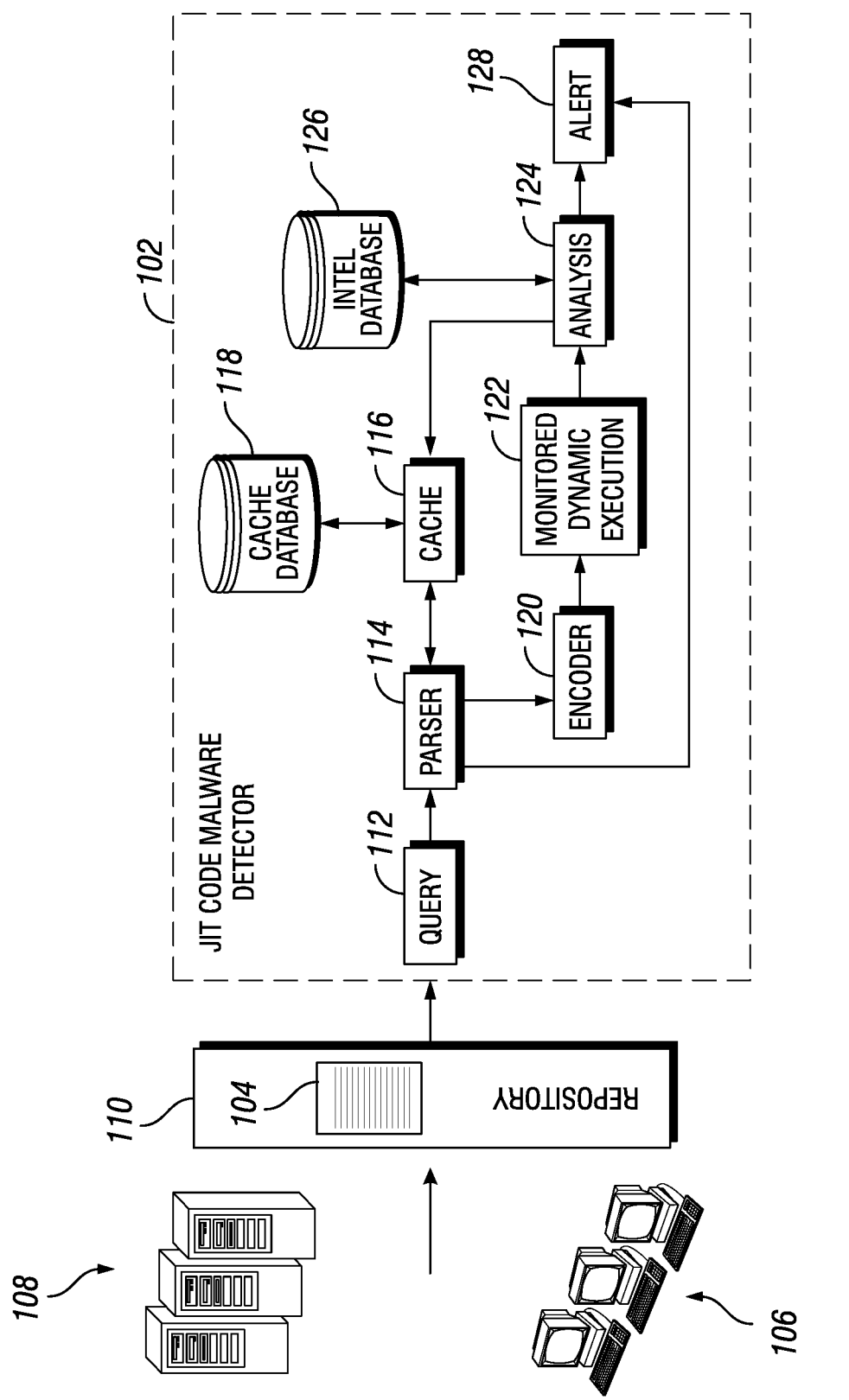
FIG. 1 is schematic diagram of a system for analyzing JIT compiled code to detect obfuscated malware and deobfuscate the malware in accordance with an embodiment of the disclosure.

FIG. 1 depicts a system 100 for analyzing just-in-time (JIT) code to identify obfuscated malicious software and deobfuscate the identified malicious software in accordance with an embodiment of the disclosure. As shown in FIG. 1, the system 100 may include a JIT code malware detector 102 that analyzes JIT code portion 104 obtained from workstations 106, servers 108, other devices, or combinations thereof. For example, such other devices may include laptop computers, tablet computer, smartphones, or other devices capable of executing JIT compiled code.

The JIT code portion 104 for analysis may be stored in a repository 110. The repository 110 may contain files (for example, log files) having the JIT code for analysis. The JIT code portion 104 may correspond to software stored on or executed by the workstations 106, servers 108, or other device.

The JIT code malware detector 102 may include various following modules and databases, such as a query module 112, a parser module 114, a cache module 116, a cache database 118, an encoder module 120, a monitored dynamic execution (MDE) module 122, an analysis module 124, a malware intelligence database 126, and an alerts module 128.

The query module 112 may query the repository for JIT code portions for analysis. The query module 112 may include instructions to store and configure rule bases that direct querying operations. As a JIT code portion is selected from the repository 110 via querying operations, the query module 112 may then send the JIT code portion to the parser module 114 for parsing. In other embodiments, the query module 112 may obtain JIT code portion directly from workstations 106, servers 108, or a combination thereof, without using the repository 110.

The parser module 114 may parse the JIT code portion received from the query module 112 for analysis. In some embodiments, the parser module 114 may parse the JIT code portion using syntax checking, tokenization, and normalization. The parsed JIT code portion may be sent to the cache module 116.

The cache module 116 compares the JIT code portion to previously analyzed JIT code portions stored in the cache database 118 to determine whether the JIT code portion has been analyzed before. The results of the comparison are provided to the parser module 114. If the JIT code portion has been previously analyzed, the JIT code portion, associated metadata, and results analysis may be sent to the parser module 114. The parser module 114 may send the previously analyzed JIT code portion, associated metadata, and results analysis to the alerts module 128.

In some embodiments, the cache module 116 may store the cache database 118 in memory and, in some embodiments, may backup the cache database 118 to non-volatile storage (for example, a hard disk) at an interval.

If the JIT code portion has not been previously analyzed, the JIT code portion is hashed and stored in the cache database 118 with associated metadata. The parser module 114 sends the JIT code portion and associated metadata to the encoder module 120.

The encoder module 120 encodes the JIT code portion to a byte stream specific to its monitored dynamic execution (MDE) runtime environment. The encoded JIT code portion is then sent to the monitored dynamic execution (MDE) module 122.

The MDE module 122 provides a JIT runtime environment specific to the programming language of the extracted JIT code portion and determines the actual (that is, deobfuscated) function calls made during execution of the extracted JIT code portion. The MDE module 122 may provide JIT functionality for syntax analysis, language grammar parsing, and a JIT runtime environment that provides the environment (for example, a complier and libraries) for execution of the JIT code portion. The MDE module also monitors and logs the dynamic execution of the encoded JIT extract. For example, runtime function calls performed by the executing JIT code portion may be monitored and logged. The MDE module 122 executes the encoded JIT code portion within the runtime environment and collects runtime data from the execution of the JIT code portion. The runtime data from the execution of the JIT code portion by the MDE module 122 are provided to the analysis module 124.

The Analysis module 124 analyzes the JIT code portion against the results of the dynamic execution to identify obfuscation. For example, the logs from the dynamic execution by the MDE module 122 may contain deobfuscated runtime function calls that may be used to identify obfuscation. The Analysis module 124 also analyzes the results of the dynamic execution against the malware intelligence database 126 to identify malicious software. For example, function calls logged by the MDE module 122 during dynamic execution of the JIT code portion may be compared against function calls stored in the malware intelligence database 126 to identify malicious software. The results of the analysis performed by the Analysis module 124 are provided to the Alerts module 128. The Alerts module 128 may log the results of the analysis of the JIT code portion and may generate alerts for sending to a cybersecurity system.

The system 100 for analyzing Just-in-Time (JIT) code is described in further detail in FIGS. 2-8. As discussed below, each of FIGS. 2-8 depict a separate module of the system 100.

Formal Model for the Detection of Obfuscated Malware in JIT Code

The system 100 may also be expressed as formal model in terms of state variables and state machines. The notation may be referred to below with reference to the detailed description of the modules illustrated in FIGS. 2-8. The formal model may include the following sets:

$T = \{t: t \in \text{unit of time in seconds since epoch}\}$ $R = \{r: r \text{ is a query entry in query ruleset}\}$ $L = \{l: l \text{ is a logging entry generated by systems (servers, workstations, devices, etc.)}\}$ $A = \{a: a \text{ is a specific logging entry artifact containing JIT code} \land A \subset L\}$ $A|_{t_i}^{t_e} = \{a_i: a_i \subset A \land (t_i, t_e) \in T \land t_i \leq t \leq t_e\}$ $J = \{j: j \text{ is JIT Code} \land j \subset A|_{t_i}^{t_e}\}$ $B = \{b: b \text{ is an encoded byte stream rendered by an encoder module}\}$ $H(j) = \{h: h \text{ is a hash function (md5, shat, sha2, etc.)} \land j \in J\}$ $F = \{f:$ $f$ is a function call, instruction, or other execution code provided by and specific to a JIT runtime environment}

$F|_{t_i}^{t_e} = \{$time series of calls $f: f \subset F \wedge t_i, t_e \in T \wedge t_i \leq t \leq t_e\}$ $Z=z$:

$z$ is a unit of analysis result provided by the analyzer module $(j_i, j_m, F|_{t_i}^{t_e})$ The modules illustrated in FIG. 1 may be defined as the following state machines expressed using the state variables enumerated above:

QUE($t_i, t_e, r$)=Query state machine module (corresponding to query module 112) that performs a series of queries R against set L, for each query from initial-time $t_i$ to end-time $t_e$ inclusive, using the query r retrieved on instantiation from query ruleset R. Overall, this state machine module performs queries against set L to retrieve JIT code portions (also referred to as "artifacts") containing JIT code and returns the set of artifacts $A|_{t_i}^{t_e}$. The artifacts are passed to parser module via PAR($A|_{t_i}^{t_e}$).

PAR ($A|_{t_i}^{t_e}$)=Parser state machine module (corresponding to parser module 114) to parse every log artifact $a_i$ containing JIT code to extract JIT code $j_i$ along with related meta data $j_m$: {hostname, type, id, timestamp, count, blockid, etc.}. The parser state machine module returns the sets of $\{j_i, j_m\}$ for all $A|_{t_i}^{t_e}$ and calls CAC($j_i, j_m$) for each member of the set to check whether the derived JIT data is cached. If cached and marked as malicious, the parser state machine module sends an alert via ALT($j_i, j_m, Z$), otherwise the parser state machine module sends to the encoder module 120 via ENC($j_i, j_m$) for each member.

CAC($j_i, j_m, F|_{t_i}^{t_e}, Z$)=Cache state machine module (corresponding to cache module 116) to query cache database to see if JIT code ($j_i$) has been analyzed before, and if so, is malicious. The cache state machine module uses hash function $h(j_i)$ for comparison. If the hashed value is cached, the cache state machine module returns True and if malicious returns ($j_i, j_m, Z$) to PAR. If the hash value is not cached the cache state machine module returns False. The cache state machine module also updates the cache database when supplied with optional parameters ($F|_{t_i}^{t_e}, Z$).

ENC($j_i, j_m$)=Encoding state machine module (corresponding to encoder module 120) to format and encode $j_i$ and $j_m$ into structured byte stream b readable by the MDE state machine module. The encoding state machine module encodes the data set and passes to monitored dynamic execution module via MDE(b) for monitored dynamic execution.

MDE(b)=Monitored Dynamic Execution (MDE) state-machine module (corresponding to MDE module 122) for JIT based code. The MDE state machine module is configured to monitor the JIT compiler and virtual machine for native system and library calls. By monitoring all function and system calls during dynamic execution, obfuscated malware calls may be determined. The resulting executed calls are stored in time series and passed onto analyzer engine via ANA($j_i, j_m, F|_{t_i}^{t_e}$).

ANA($j_i, j_m, F|_{t_i}^{t_e}$)=Analysis state machine module (corresponding to the analysis module 124) for analyzing time series based execution call data resulting from monitored dynamic execution. The analysis state machine module may match the runtime calls against known execution call patterns and sequences to identify possible obfuscation of the original JIT code $j_i$ and possible maliciousness. The analysis may include signature matching, heuristic matching, n-gram based analysis, and time series based analysis using a deep learning recurrent neural network (RNN) for anomaly detection. The analysis results may be cached into the cache via CAC($j_i, j_m, F|_{t_i}^{t_e}, Z$) and sent to the alerting state machine module via ALT ($j_i, j_m, Z$).

ALT ($j_i, j_m, Z$)=Alerting state-machine module (corresponding to the alert module 128) that send results to a security monitoring system for logging and alerting.

System Components for the Detection of Obfuscated Malware in JIT Code

FIG. 2 depicts operation of the query module 112 in accordance with an embodiment of the disclosure. As shown in FIG. 2, the query module 112 may receive JIT code portion 104 for analysis from the repository 110. The query module may also receive or have access to rules 200, such as from a rule base. As shown by decision block 204, the operations of the query module 112 may be performed for each rule in the rule base. For each rule in the rule base, a loader (block 206) loads a selected rule from the rule base into the query engine (block 208).

The query engine (block 208) performs a query against the central repository using the rule parameters from the selected rule to collect all the relevant JIT code portions (also referred to as "artifacts") within the beginning and end time frames as noted in the rule. For example, each query may include one or more of the following: command keywords, search patterns utilizing indexes or specific strings, and pipes of the results to modifiers such as for regular expression matching, filtering, formatting, or computational evaluation. As will be appreciated, the available functionality of a query may be depend on the implementation of the repository 104 or, in some embodiments, may be implemented in the query module 112 itself.

In some embodiments, the rules 200 may include a JavaScript Object Notation (JSON) formatted array of rules which can be stored in a file or NoSQL database (for example, MongoDB available from MongoDB Inc. of New York City, N.Y., USA). In such embodiments, the rules may be queried using JSON standard libraries either from the file or database. The rules themselves include an array of rules as described above containing commands, search patterns, and pipes to modifiers for regular expression matching, filtering, formatting, etc. Two example query rules according to this embodiment are provided below:

"QUERIES" : [
{
"QUERY" :"search index=wstat_win code=9999 | rex field=Message
\"(?s)^Creating Scriptblock text \\\\((\\\\d) of
(\\\\d)\\\\)\\\\:\\n(?<Script>.*)(?:\\n){2}ScriptBlock ID\\: (?<ScriptBlockID>(.{8}\\-
.{4}\\-.{4}\\-.{4}\\-.{12}))\" | rex field=Message
\"(?s)(?:\\n1){2}\\n(?<Script>.*)\\n(?<ScriptBlockID>(.{8}\\-.{4}\\-.{4}\\-
.{12}))(\\n(?:(\\\\\\\\)|(.\\:)).*)?$\" | stats list(Script) as Script max(_time) as
Time values(ComputerName) as ComputerName count by ScriptBlockID | eval
Time=strftime(Time,\"%d/%m/%Y %I:%M:%S %p\") | fields Time ComputerName Script
ScriptBlockID count",

```
            "KWARGS" : {
                    "earliest_time": "-60m",
                    "latest_time": "now",
                    "search_mode": "normal"
            }
    },
    {
            "QUERY" :"search index=sstat_win code=8888 | reverse | table _time Message
ComputerName | eval Time=strftime(Time,\"%d/%m/%Y %I:%M:%S %p\") | fields Time
ComputerName Script ScriptBlockID",
            "KWARGS" : {
                    "earliest_time": "-120m",
                    "latest_time": "now",
                    "search_mode": "fast"
            }
    }
]
```

As shown above, example rules include a search being requested for a particular index in the repository, along with value matching a specific code. The example also includes modifiers that are provided inputs via pipes; for example regular expression matching and filtering, counters, time value formatting, field selection, etc. In this embodiment, each Query has argument values which can specify the beginning and end time, along with search mode. As will be appreciated, the above queries are merely provided as examples and other embodiment may include different capabilities and formatting for use with the techniques described in the disclosure.

Once the results of the query are determined, the query engine (block 208) passes the results dataset to a parser (block 210). It should be appreciated that the parser (block 210) of the query module 112 should be distinguished from the parser module 114 of the system 100 and refers to a procedure, function, routine, or subroutine executed within the query module 112.

The parser (block 210) parses through the results dataset via parsing, block-id based concatenation, syntax checking, tokenization, and normalization to generate sets of JIT code portions (block 212). Using these techniques may enable the parser (block 210) to resolve inconsistent, corrupted, or missing data in the results dataset. Additionally, in some embodiments, larger datasets may be stored across numerous records, and the parser (block 210) may generate sets of JIT code portions via these techniques from the larger results datasets. After the JIT code portions are generated, the JIT code portions may be stored in a queue and provided to a sender (block 214). As shown by connection block A, the sender (block 214) may forward each JIT code portion dataset to the parser module 114, the operation of which is illustrated in FIG. 3.

FIG. 3 depicts operation of the parser module 114 in accordance with an embodiment of the disclosure. As shown by connection block A in FIG. 3, the parser module 114 may receive JIT code portions (block 212) generated by the query module 112. The parser module 114 may select and process each JIT code portion one at a time, and as shown by decision block 300, the operations of the parser module 114 may be performed for each JIT code portion in the JIT code portion dataset (block 212). The parser (block 302) of the parser module 114 may parse each JIT code portion to extract relevant JIT code portion, make syntax and language checks, and provide the parsed JIT code portion to the normalizer (block 304).

The normalizer 304 normalizes the JIT code portion and, in some embodiments, may request the next chunk of artifact for those instances in which the JIT code portion is distributed across many JIT code portion records in the JIT code portions dataset (block 212). The dataset along with the parsed JIT code portion is provided to the meta analyzer (block 306). The meta analyzer (block 306) derives related metadata from the dataset. In some embodiments, the metadata may include but is not limited to hostname, type, id, timestamp, count, and block-id.

Figure 4:
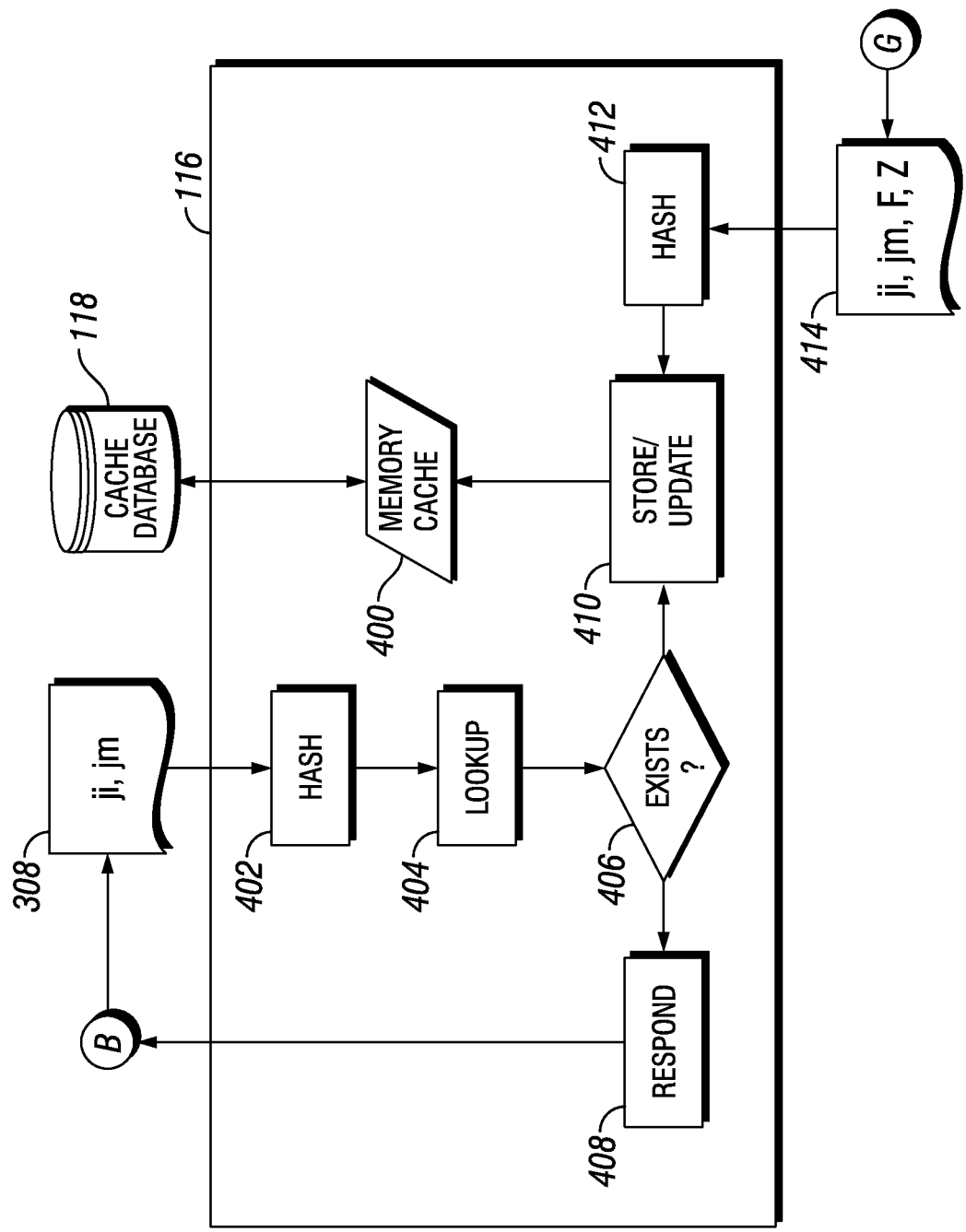
FIG. 4 is a block diagram of the operation of a cache module of the system of FIG. 1 in accordance with an embodiment of the disclosure.

The JIT code portion ($j_i$) and the associated metadata ($j_m$) (block 308) derived by the meta-analyzer is provided to queue to be sent by the sender (block 310). As shown by connection block B, the sender (block 310) first sends the JIT code portion and metadata to the Cache module 116, the operation of which is illustrated in FIG. 4. If the JIT code portion has previously been processed by the system 100, the cache module 116 returns an indicator (for example, "true") and also provides any related data regarding the maliciousness of the JIT code portion. As shown by connection block C, if the JIT code portion is malicious the sender (block 310) then sends an alert to the ALT alert module, the operation of which is depicted in FIG. 5, in order to generate an alert to security monitoring systems with the relevant JIT code portion and metadata. As shown by connection block D, if the Cache module 116 does not find the JIT code portion in the cache database, the Cache module 116 returns an indicator (for example, a "false"), and the sender 310 forwards the JIT code portion with the associated metadata to the ENC encoder module.

FIG. 4 depicts operation of the Cache module 116 in accordance with an embodiment of the disclosure. As shown by connection block B in FIG. 4, the Cache module 116 may receive JIT code portion ($j_i$) and associated metadata ($j_m$) (block 308) from the parser module 114. The Cache module 116 store the cache in volatile memory (block 400) and may synchronize the cache to non-volatile storage, such as a database (block 118) stored on a hard disk drive (HDD) or solid state drive (SSD). For example, in some embodiments, the cache may be synchronized periodically based on time intervals or when the volatile memory cache is changed. The cache may store hash values representing hashes of JIT code portion, and metadata associated with the JIT code portion, including an indicator as to whether the JIT code portion is malicious.

As shown in FIG. 4, the Cache module 116 may hash (block 402) the JIT code portion ($j_i$) and associated metadata ($j_m$) to generate a hash value and may lookup (block 404) the hash value in the memory cache 400 to evaluate whether the hash value exists (decision block 406) in the cache of previously analyzed JIT code portions. If the hash value exists in the cache (that is, indicating that the JIT code portion has previously been analyzed), the Cache module 116 may respond (block 408) by sending the hash value of the JIT code portion and associated metadata, and the analysis results, to the parser module 114, as shown by connection block B. If the hash value does not exist in the cache (that is, indicating that the JIT code portion has not previously been analyzed), the hash value may be stored (block 410) by updating the memory cache (block 400).

FIG. 5 depicts operation of the encoder module 120 in accordance with an embodiment of the disclosure. As shown by connection block D in FIG. 5, if the JIT code portion has not previously been analyzed, the encoder module 120 may receive JIT code portion ($j_i$) and associated metadata ($j_m$) (block 308) from the parser module 114. The encoder module 120 may select and process each received JIT code portion one at a time from a queue, and as shown by decision block 500, the operations of the parser module 114 may be performed for each JIT code portion in the queue. The parser (block 502) of the encoder module 120 may parse the JIT code portion for verification and to determination selection of the appropriate JIT compiled environment, and provide the JIT code portion to a normalizer (block 504). The normalizer (block 504) may format the JIT code portion into the appropriate format and send the formatted JIT code portion to an encoder (block 506).

The encoder (block 506) encodes the JIT code portion into a byte stream (block 510) that is stored in a queue for sending by a sender (block 512). As shown by connection block E, the sender (block 512) may send each byte stream record in the queue to the MDE module 122, the operation of which is depicted in FIG. 6.

FIG. 6 depicts operation of the MDE module 122 in accordance with an embodiment of the disclosure. As shown by connection block E in FIG. 6, the MDE module 122 may receive a byte stream (block 600) into a queue. An orchestrator (block 602) of the MDE module 122 may read the byte stream to determine the appropriate virtual machine environment. The orchestrator (block 602) may then use a virtual machine application programming interface (API) (block 604) to instantiate the appropriate virtual machine (for example, block 606 or block 608) for dynamic execution of the JIT code portion byte stream (block 600) in a JIT runtime environment. For example, the instantiation and monitoring of the virtual machines (block 606 or block 608) may be performed using a virtual hypervisor (block 610).

The virtual machines (block 606 or block 608) may be configured with operating system monitors (block 612 or block 614), JIT virtual machine monitors (block 616 or block 618), and process monitors (block 620 or block 622) monitor the JIT runtime (blocks 624 or block 626) corresponding to the read byte stream. The virtual machines dynamically execute the JIT code portion (as received as the byte stream) and collect runtime data in time series (for example, the runtime data may include runtime calls stored in time series). The runtime data may include, by way of example, function calls, instructions, native system calls, library calls, or any combination thereof.

The relevant runtime data may be returned to the orchestrator (block 604) via the virtual machine API (block 604) and the JIT code portion ($j_i$), associated metadata ($j_m$), and runtime data (for example, function calls, instructions, and native system calls F) (block 628) may be stored in a queue for a sender (block 630). As shown by connection block F, the sender (block 630) reads the records from the queue and provides the JIT code portion ($j_i$), associated metadata ($j_m$), and runtime data (for example, function calls, instructions, and native system calls F) to the analyzer module 124 for analysis, the operation of which is depicted in FIG. 7.

Figure 7:
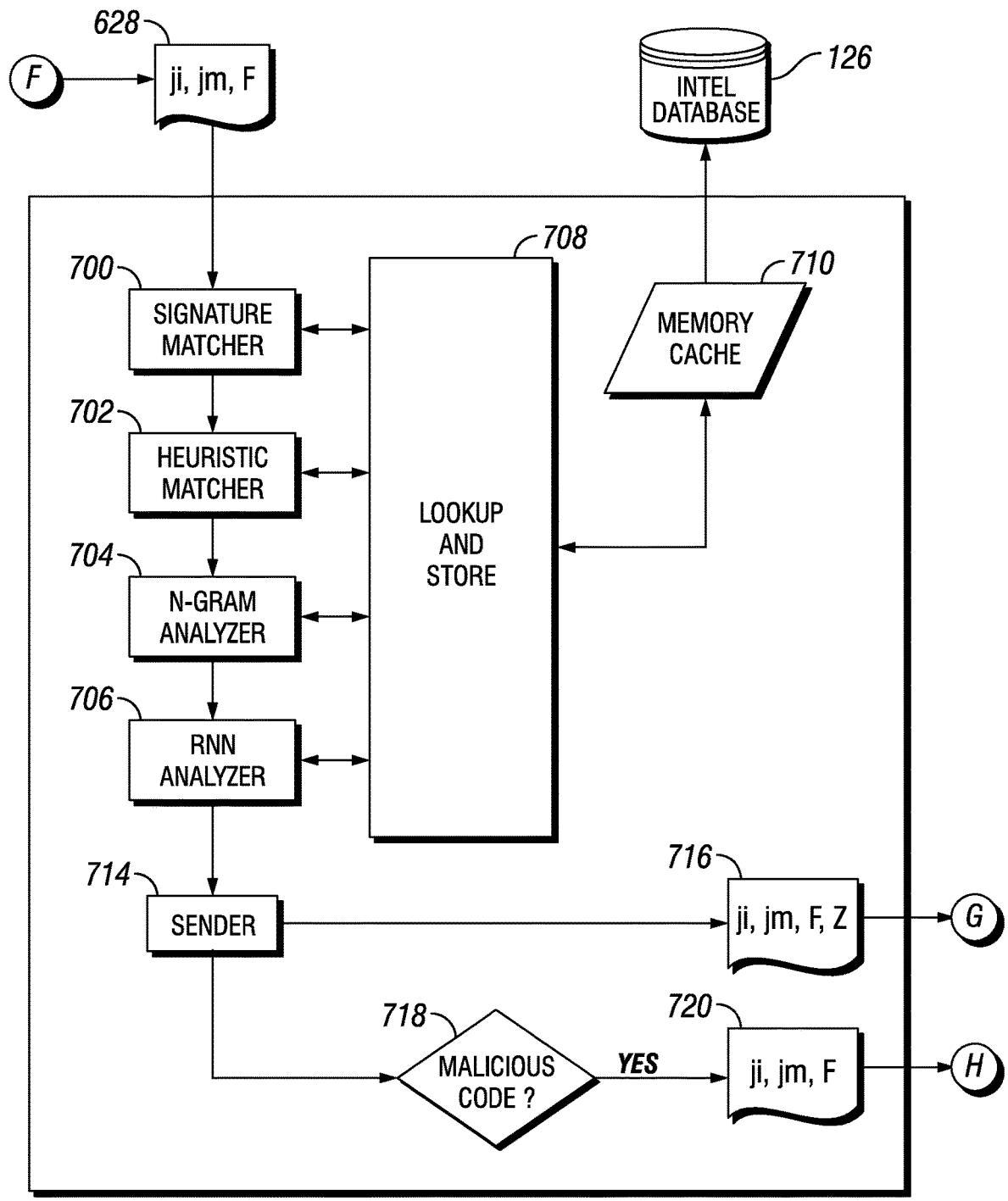
FIG. 7 is a block diagram of the operation of an analyzer module of the system of FIG. 1 in accordance with an embodiment of the disclosure.

FIG. 7 depicts operation of the analyzer module 124 in accordance with an embodiment of the disclosure. As shown by connection block F in FIG. 7, the analyzer module 124 may receive the JIT code portion ($j_i$), associated metadata ($j_m$), and runtime data (for example, function calls and instructions F) (block 630) into a queue.

The analyzer module 124 includes a series of engines to evaluate the JIT code portion for maliciousness. A signature matcher (block 700) of the analyzer module 124 may use known signatures of malicious indicators to evaluate the JIT code portion for maliciousness. For example, the signature matcher (block 700) may compare the signature of known malicious JIT code portion, function calls, or instructions to the JIT code portion ($j_i$), associated metadata ($j_m$), and runtime data (for example, function calls, instructions, and native system calls F) (block 630). Next, a heuristic matcher (block 702) uses rule-based heuristic matching to evaluate the JIT code portion ($j_i$), associated metadata ($j_m$), or runtime data (F) for maliciousness. For example, the heuristic matching may be based on JIT code portion patterns or runtime behavioral patterns indicated in the runtime data. In some embodiment, an n-gram analyzer (block 704) may detect anomalies in the runtime data (for example, function calls or instructions) from a known set of behaviors (for example, n-grams of n=1, n=2, n=3, n=4, n=5, n=6, or n>6). A recurrent neural network (RNN) analyzer (block 706) may detect malicious activities against the time-series stored set of runtime data (for example, function calls or instructions) to identify maliciousness. In other embodiments, other types of neural networks may be used.

The various analysis engines—the signature matcher (block 700), the heuristic matcher (block 702), the n-gram analyzer (block 704), and the (RNN) analyzer (block 706)—may lookup and store (block 708) data in a cache in volatile memory (block 710). The analyzer module 124 may synchronize the cache to non-volatile storage, such as a malware intelligence database (block 126). For example, in some embodiments, the cache may be synchronized periodically based on time intervals or when the volatile memory cache is changed. The malware intelligence database may store data used by the various analysis engines of the analyzer module 124. For example, the malware intelligence database (block 126) may store signatures of malicious indicators, heuristic rules, and n-grams. The analysis results (Z) may be stored in a queue for a sender (block 714). As shown by connection block G, in some embodiments the sender (block 714) may send the JIT code portion ($j_i$), associated metadata ($j_m$), runtime data (F), and analysis results (Z) (block 716) to the cache module 116 for caching as previously analyzed. As shown in FIG. 4, the cache module 116 may hash (block 412) the JIT code portion ($j_i$) and associated metadata ($j_m$) (block 414 in FIG. 4) to generate a hash value. The hash value may be stored (block 410) with the analysis results (Z) by updating the memory cache (block 400).

Figure 8:
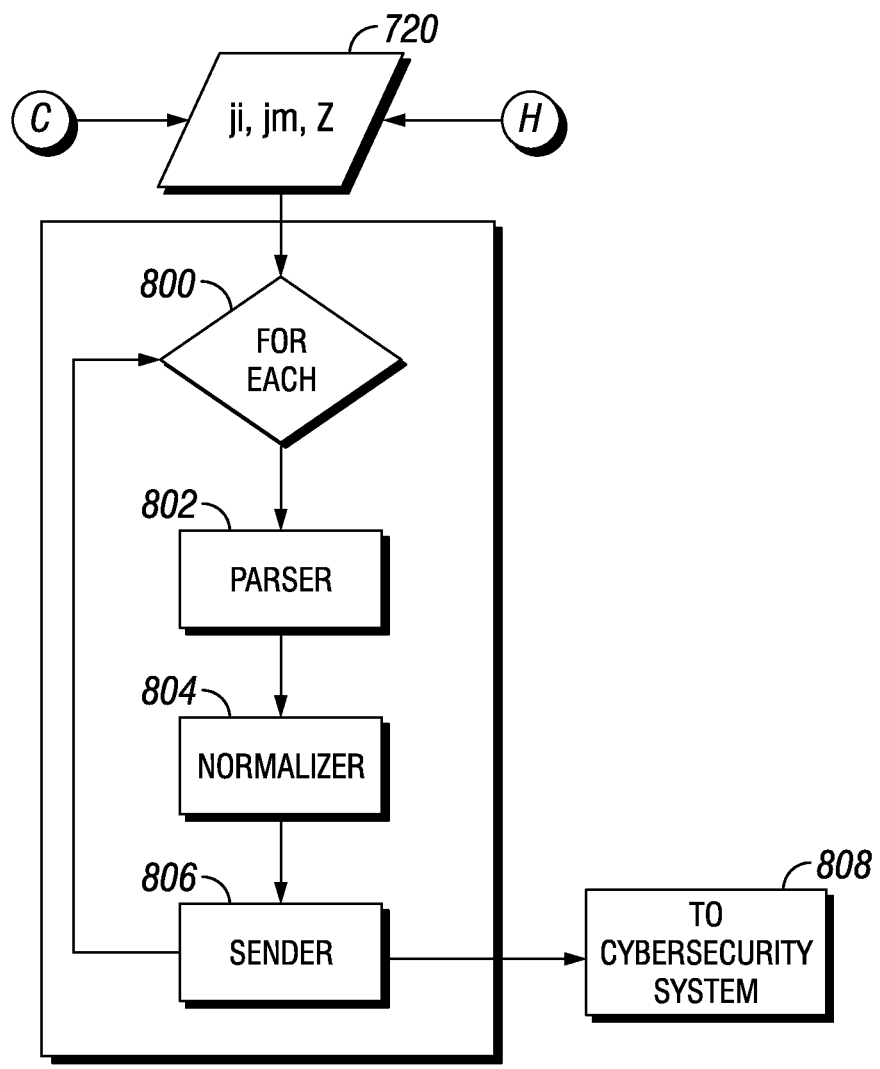
FIG. 8 is a block diagram of the operation of an alerts module of the system of FIG. 1 in accordance with an embodiment of the disclosure.

As shown by connection block H, if the analysis determines that the JIT code portion is malicious (decision block 718), the sender (block 714) may send the JIT code portion ($j_i$), associated metadata ($j_m$), and analysis results (Z) (block 720) to the alert module 128, the operation of which is depicted in FIG. 8.

FIG. 8 depicts operation of the alert module 128 in accordance with an embodiment of the disclosure. As shown by connection blocks C and H in FIG. 8, the alert module 128 may receive the JIT code portion ($j_i$), associated metadata ($j_m$), and analysis results (Z) (block 720) into a queue. The JIT code portion ($j_i$), associated metadata ($j_m$), and analysis results (Z) (block 720) may be received from the parser module 114, illustrated via connection block C, or the analyzer module 124, illustrated via connection block H.

The alert module 128 may select and process each JIT code portion one at a time, and as shown by decision block 800, the operations of the parser module 128 may be performed for each JIT code portion in the queue. A parser (block 802) may parse the JIT code portion ($j_i$), associated metadata ($j_m$), and analysis results (Z). A normalizer (block 704) may normalize the parsed data into an alert format. A sender (block 806) may provide the formatted alert to other systems (such as a security monitoring system (block 808))).

Process for the Detection of Obfuscated Malware in JIT Code

Figure 9A:
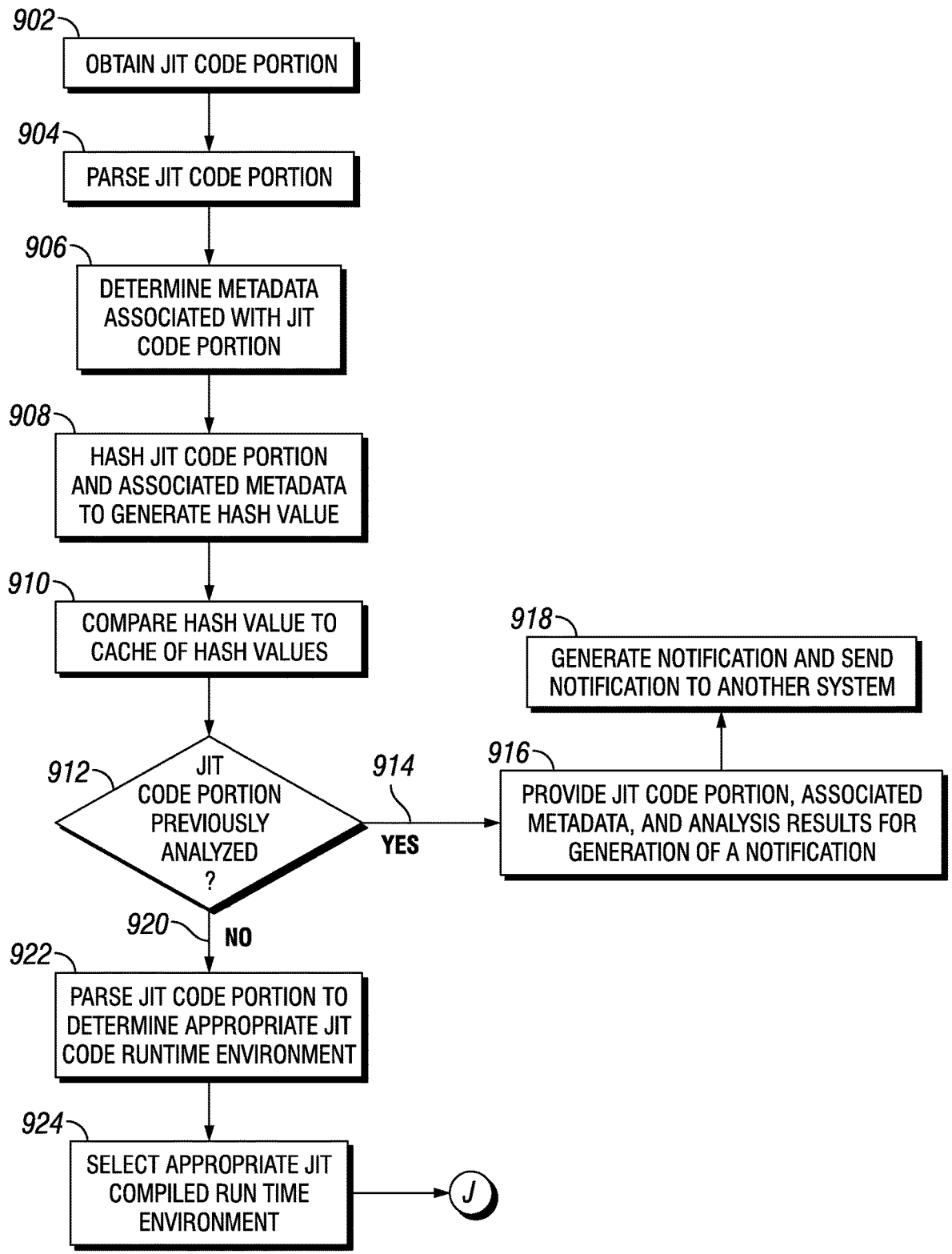
FIGS. 9A and 9B are flowcharts of a process for detecting obfuscated malware in JIT compiled code in accordance with an embodiment of the disclosure.
Figure 9B:
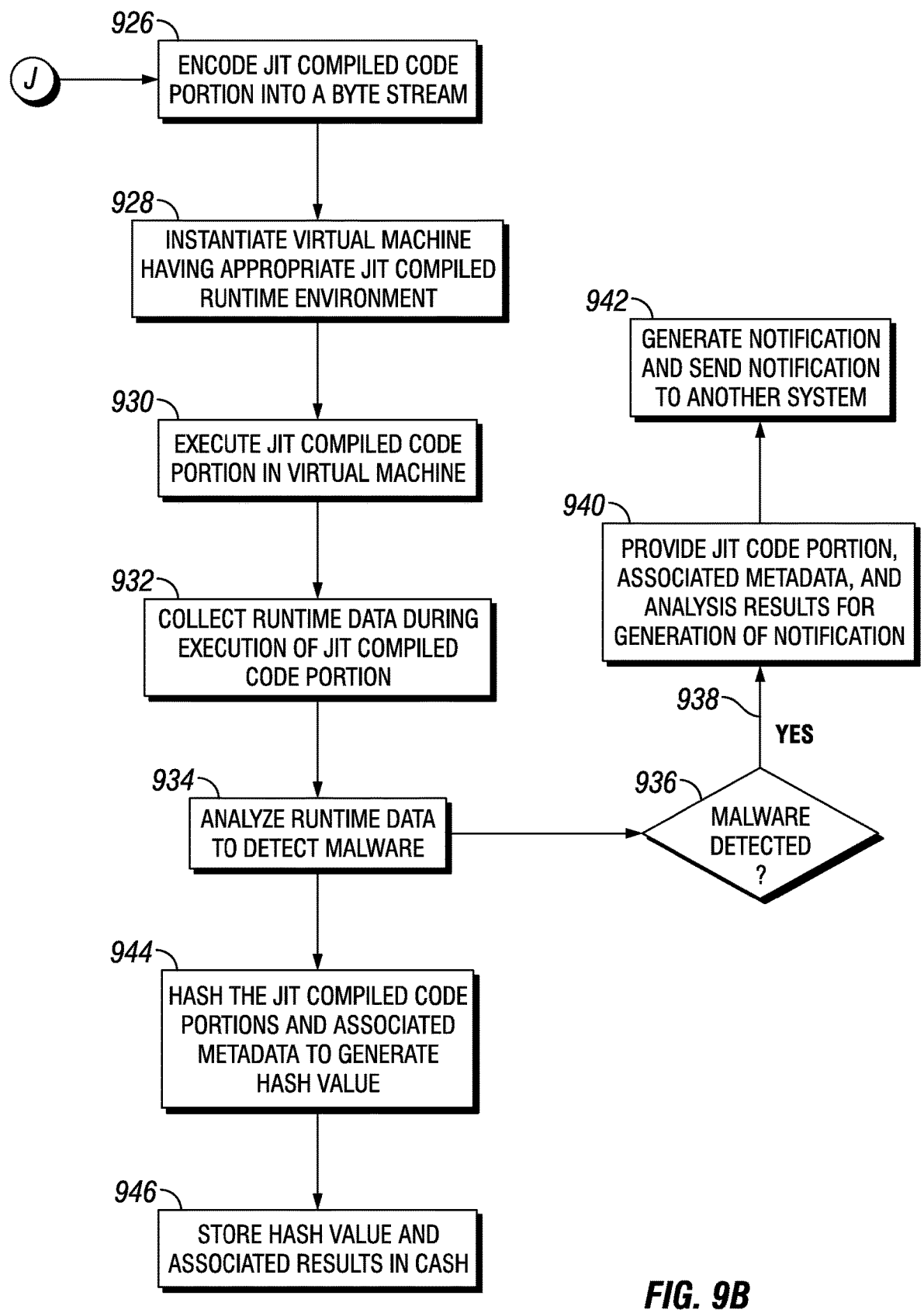

FIGS. 9A and 9B depict a process 900 for detecting malware in JIT compiled code in accordance with an embodiment of the disclosure. Initially, a JIT code may be obtained (block 902), such as by a querying a repository. In some embodiments, the query may be based on a rule selected from a rule-base. Next, the obtained JIT code (for example, the results of the query) may be parsed to generate a dataset of JIT code portions for further analysis (block 904). In some embodiments, the parsing may include syntax and language checks of the JIT code portion. Next, metadata may be determined from the JIT code portion (block 906). In some embodiments, the metadata may include but is not limited to hostname, type, id, timestamp, count, and block-id.

The JIT code and associated metadata may be hashed to generate a hash value (908). The hash value may be compared to a cache of hash values of previously analyzed JIT code portions and associated metadata (block 910) to determine if the JIT code portion was previously analyzed (decision block 912).

If the JIT code portion was previously analyzed (line 914) and was identified as malicious (that is, as having detected malware), the JIT code portion, associated metadata, and analysis results may be provided for generation of a notification (block 916), such as an alert. For example, the JIT code portion, associated metadata, and analysis results may be provided to a module that generates a notification and sends the notification to another system (block 918). For example, in some embodiments, the JIT code portion, associated metadata, and analysis results may be provided to an alerts module that generates an alert and sends the alert to a cybersecurity system.

If the JIT code portion was not previously analyzed (920), the JIT code portion may be parsed to determine the appropriate JIT runtime environment for the execution of the JIT compiled code (block 922), and the appropriate JIT runtime environment may be selected (block 924). For example, the JIT runtime environment may include the appropriate JIT compiler and libraries. The determination of the appropriate JIT runtime environment may be based on the programming language of the JIT code portion. As shown by connection block J, the process 900 is further illustrated in FIG. 9B

As shown in FIG. 9B, the JIT code portion may then be encoded into a byte stream (block 926). Next, a virtual machine having the appropriate JIT runtime environment may be instantiated (block 928). The JIT code portion may be executed in the virtual machine (block 930), and runtime data may be collected during the execution of the JIT compiled code portion (block 932). The runtime data may be analyzed to detect malware (block 934) and to determine further steps (decision block 936) of the process 900. The analysis of runtime data may include, for example, signature matching, heuristic matching n-gram analysis, and RNN analysis, as described above.

If malware is detected (line 938), the JIT code portion, associated metadata, and analysis results may be provided for generation of a notification (block 940), such as an alert. For example, the JIT code portion, associated metadata, and analysis results may be provided to a module that generates a notification and sends the notification to another system (block 942). For example, in some embodiments, the JIT code portion, associated metadata, and analysis results may be provided to an alerts module that generates an alert and sends the alert to a cybersecurity system. If no malware is detected, no further actions are taken.

Additionally, the JIT compiled code and associated data may be hashed to generate a hash value (block 944). The hash value and analysis results for the JIT compiled code portion may be stored in the cache of hash values of previously analyzed JIT compiled code (block 946).

In some embodiments, a JIT compiled code analyzer (for example, JIT code malware detector 102), and elements of the process 900 for example, may be implemented on a processing system operable for processing operations via computer programming, such as a computer. For example, a suitable processing system may include or be a combination of a cloud computing system or service, a data center, a computer cluster, a server, a virtual server, a desktop computer, a laptop computer, a tablet computer, or other systems, services, or devices that provide suitable components.

In some embodiments, for example, a JIT compiled code analyzer (for example, JIT code malware detector 102), and elements of the process 900 for example, may be implemented on a processing system may be implemented on a processing system having a processor and a non-transitory computer-readable medium (such as a volatile or non-volatile memory). As will be appreciated, in some embodiments such a processing system may include other components such as a display, network interface, input device, etc.

A processor of an example processing system (as used the disclosure, the term "processor" encompasses microprocessors) may include one or more processors. In some embodiments, the processor may include an application-specific integrated circuit (ASIC). In some embodiments, the processor may include a reduced instruction set (RISC) processor. Additionally, the processor may include a single-core processors and multicore processors and may include graphics processors. Multiple processors may be employed to provide for parallel or sequential execution of one or more of the techniques described in the disclosure. The processor may receive instructions and data from non-transitory computer-readable medium (such as a volatile or non-volatile memory) of the processing system or otherwise accessible by the processor.

The non-transitory computer-readable medium of an example processing system may include volatile memory, such as random access memory (RAM), and non-volatile memory, such as read-only memory (ROM), flash memory, a hard drive, any other suitable optical, magnetic, or solid-state storage medium, or a combination thereof. The memory may store executable computer code. The executable computer code may include computer program instructions for implementing techniques described in the disclosure, such as the JIT code malware detector 102 and the elements of the process 900. In some embodiments, for example, the executable computer code may include modules of computer program instructions that define various modules of the JIT code analyzer, such as the query module 112, the parser module 114, the cache module 116, the encoder module 120, the MDE module 122, the analysis module 124, and the alerts module 128. The computer program instructions (which in certain forms is known as a program, software, software application, or code) may be written in a computer programming language, including suitable compiled or interpreted languages. For example, in some embodiments, the computer program instructions implementing techniques described in the disclosure may be written in Python. In some embodiments, the non-transitory computer-readable medium of the processing system may store various databases, such as a cache database 118 and the malware intelligence database 126. In other embodiments, databases such as the cache database 118 and the malware intelligence database 126 may be stored on other non-transitory computer-readable mediums accessible by the example processing system.

The example processing system may be in communication with other systems via, for example, a network interface. The network interface may include a wired network interface card (NIC), a wireless (for example, radio frequency) network interface card, or combination thereof. The network interface may include circuitry for receiving and sending signals to and from communications networks, such as an antenna system, an RF transceiver, an amplifier, a tuner, an oscillator, a digital signal processor, and so forth. The network interface may communicate with networks (for example, network 504), such as the Internet, an intranet, a wide area network (WAN), a local area network (LAN), a metropolitan area network (MAN) or other networks. Communication over networks may use suitable standards, protocols, and technologies, such as Ethernet Bluetooth, Wireless Fidelity (Wi-Fi) (for example, IEEE 802.11 standards), and other standards, protocols, and technologies.

In some embodiments, the network interface may enable communication with a cybersecurity system that may receive and process alerts or other notifications received from a JIT compiled code analyzer. In such embodiments, a cybersecurity system may be implemented using a processing system similar to the example processing system described herein. In some embodiments, a cybersecurity system may be used by a security personal to monitor other systems, computers, and devices for the presence of malware. A cybersecurity system may include suitable components for alerting or otherwise notifying such personnel of the presence of malware, such as via audio alerts, visual alerts, audiovisual alerts, e-mails, text messages, or any combination thereof.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method for detecting obfuscated malware in just-in-time (JIT) code, comprising:
   obtaining a portion of JIT code from a repository;
   associating the JIT code portion with metadata, wherein the metadata comprises at least one of: a hostname, a host type, a host identifier, and a timestamp;
   hashing the JIT code portion and metadata to generate a hash value;
   comparing the hash value to a plurality of hash values stored in a cache, the plurality of hash values corresponding to a respective plurality of previously analyzed JIT code portions;
   determining, based on the comparison of the hash value to the plurality of hash values, that JIT code portion is not one of the plurality of previously analyzed JIT code portions;
   parsing the JIT code portion to determine an execution environment for execution of the JIT code portion;
   selecting the execution environment before instantiating a virtual machine comprising the executing environment for the JIT code portion;
   encoding the JIT code portion into a byte stream;
   instantiating the virtual machine comprising the executing environment for the JIT code portion;
   executing the JIT code portion in the virtual machine;
   collecting runtime data during the executing, the runtime data comprising function calls;
   analyzing the runtime data to detect malware; and
   providing the JIT code portion and associated metadata for generation of a notification based on the detection of malware.

2. The method of claim 1, wherein obtaining the portion of JIT code from a repository comprises:
   selecting a rule from a rule base; and
   querying the repository according to the selected rule.

3. The method of claim 1, wherein analyzing the runtime data to detect malware comprises comparing a signature of a known malicious indicator to the runtime data.

4. The method of claim 1, wherein analyzing the runtime data to detect malware comprises:
   performing a heuristic matching of the JIT code based on a JIT code patterns; or
   performing a heuristic matching of the runtime data based on runtime behavioral patterns.

5. The method of claim 1, wherein analyzing the runtime data to detect malware comprises
   performing an n-gram analysis of the runtime data based on a plurality of predetermined n-grams.

6. The method of claim 1, wherein analyzing the runtime data to detect malware comprises
   analyzing the runtime code using a recurrent neural network (RNN).

7. The method of claim 1, wherein the hash value is a first hash value, (Original) The method comprising:
   hashing, after analyzing the runtime data to detect malware, the JIT code portion and the associated metadata to produce a second hash value; and
   storing the second hash value in the cache of the plurality of previously analyzed hashed values.

8. A system for detecting obfuscated malware in just-in-time (JIT) code, comprising:
   a processor;
   a non-transitory computer readable memory having executable instructions stored thereon, the executable instructions comprising code that cause the processor to perform operations comprising:

obtaining a portion of JIT code from a repository;

associating the JIT code portion with metadata, wherein the metadata comprises at least one of: a hostname, a host type, a host identifier, and a timestamp;

hashing the JIT code portion and metadata to generate a hash value;

comparing the hash value to a plurality of hash values stored in a cache, the plurality of hash values corresponding to a respective plurality of previously analyzed JIT code portions;

determining, based on the comparison of the hash value to the plurality of hash values, that JIT code portion is not one of the plurality of previously analyzed JIT code portions;

parsing the JIT code portion to determine an execution environment for execution of the JIT code portion;

selecting the execution environment before instantiating a virtual machine comprising the executing environment for the JIT code portion;

encoding the JIT code portion into a byte stream;

instantiating the virtual machine comprising the executing environment for the JIT code portion;

executing the JIT code portion in the virtual machine;

collecting runtime data during the executing, the runtime data comprising function calls;

analyzing the runtime data to detect malware; and providing the JIT code portion and associated metadata for generation of a notification based on the detection of malware.

9. The system of claim 8, wherein analyzing the runtime data to detect malware comprises comparing a signature of a known malicious indicator to the runtime data.

10. The system of claim 8, wherein analyzing the runtime data to detect malware comprises:

performing a heuristic matching of the JIT code based on a JIT code patterns; or performing a heuristic matching of the runtime data based on runtime behavioral patterns.

11. The system of claim 8, wherein analyzing the runtime data to detect malware comprises performing an n-gram analysis of the runtime data based on a plurality of predetermined n-grams.

12. The system of claim 8, wherein analyzing the runtime data to detect malware comprises analyzing the runtime code using a recurrent neural network (RNN).

13. The system of claim 8, comprising a network interface, the operations comprising sending, over the network interface, the alert to a security system.

14. A non-transitory computer readable medium having executable instructions stored thereon for detecting obfuscated malware in just-in-time (JIT) code, the executable instructions comprising code that causes a processor to perform operations comprising:

obtaining a portion of JIT code from a repository;

associating the JIT code portion with metadata, wherein the metadata comprises at least one of: a hostname, a host type, a host identifier, and a timestamp;

hashing the JIT code portion and metadata to generate a hash value;

comparing the hash value to a plurality of hash values stored in a cache, the plurality of hash values corresponding to a respective plurality of previously analyzed JIT code portions;

determining, based on the comparison of the hash value to the plurality of hash values, that JIT code portion is not one of the plurality of previously analyzed JIT code portions;

parsing the JIT code portion to determine an execution environment for execution of the JIT code portion;

selecting the execution environment before instantiating a virtual machine comprising the executing environment for the JIT code portion;

encoding the JIT code portion into a byte stream;

instantiating the virtual machine comprising the executing environment for the JIT code portion;

executing the JIT code portion in the virtual machine;

collecting runtime data during the executing, the runtime data comprising function calls;

analyzing the runtime data to detect malware; and providing the JIT code portion and associated metadata for generation of a notification based on the detection of malware.

15. The non-transitory computer readable medium of claim 14, wherein analyzing the runtime data to detect malware comprises comparing a signature of a known malicious indicator to the runtime data.

16. The non-transitory computer readable medium of claim 14, wherein analyzing the runtime data to detect malware comprises:

performing a heuristic matching of the JIT code based on a JIT code patterns; or performing a heuristic matching of the runtime data based on runtime behavioral patterns.

17. The non-transitory computer readable medium of claim 14, wherein analyzing the runtime data to detect malware comprises performing an n-gram analysis of the runtime data based on a plurality of predetermined n-grams.

18. The non-transitory computer readable medium of claim 14, wherein analyzing the runtime data to detect malware comprises analyzing the runtime code using a recurrent neural network (RNN).

* * * * *